(12) United States Patent
Hägg

(10) Patent No.: US 6,828,930 B2
(45) Date of Patent: Dec. 7, 2004

(54) SYSTEM AND METHOD IN A RADAR LEVEL GAUGING SYSTEM

(75) Inventor: Lennart Hägg, Kungsbacka (SE)

(73) Assignee: Saab Rosemount Tank Radar AB, Gothenburg (SE)

( * ) Notice: Subject to any disclaimer, the term of this patent is extended or adjusted under 35 U.S.C. 154(b) by 5 days.

(21) Appl. No.: 10/393,371

(22) Filed: Mar. 21, 2003

(65) Prior Publication Data

US 2004/0183718 A1 Sep. 23, 2004

(51) Int. Cl.$^7$ .............................. G01S 13/08; G01S 7/40
(52) U.S. Cl. ...................... 342/124; 342/118; 342/165; 342/173; 342/174; 342/175; 342/195; 73/290 R; 73/304 R; 73/304 C
(58) Field of Search ........................ 324/71.1; 73/64.55, 73/149, 861, 861.08–861.17, 290 R, 304 R, 304 C, 290 B, 290 V; 342/22, 59, 118, 124, 165–175, 192–197

(56) References Cited

U.S. PATENT DOCUMENTS

| | | | |
|---|---|---|---|
| 5,103,368 A | | 4/1992 | Hart |
| 5,438,867 A | | 8/1995 | van der Pol |
| 5,969,666 A | * | 10/1999 | Burger et al. ................ 342/124 |
| 6,353,407 B1 | * | 3/2002 | Donnelly ..................... 342/124 |
| 6,373,428 B1 | * | 4/2002 | McEwan ...................... 342/175 |
| 6,405,590 B1 | | 6/2002 | Byatt et al. |
| 6,414,627 B1 | * | 7/2002 | McEwan ...................... 342/124 |
| 6,462,705 B1 | * | 10/2002 | McEwan ...................... 342/175 |
| 6,662,649 B1 | * | 12/2003 | Knight et al. ................ 342/124 |

FOREIGN PATENT DOCUMENTS

| | | |
|---|---|---|
| DE | 19510484 A1 | 10/1996 |
| DE | 10051151 | 4/2001 |
| EP | 1076227 A1 | 2/2001 |
| GB | 2358535 A | 7/2001 |

OTHER PUBLICATIONS

D. Brumbi, "Measuring Process and Storage Tank Level with Radar Technology"; Record of the IEEE 1995 International Radar Conference (May 8–11, 1995); pp. 256–260.*

* cited by examiner

Primary Examiner—Bernarr E. Gregory
(74) Attorney, Agent, or Firm—Westman, Champlin & Kelly, P.A.

(57) ABSTRACT

The present invention relates to the field of radar level gauging systems, in which a level of a surface of a product stored in a container is measured. The gauging system comprises: a radar level gauge arranged above the surface of the product which is arranged to transmit a microwave signal towards the product surface and receive a reflected microwave signal from the product surface; a calculation unit arranged to determine a measured value of the product level based upon the received signal; means for comparing the measured value of the product level with a predetermined value; and a second level gauge arranged closed to the bottom of the container and arranged to determine the product level when the measured value is below the predetermined value.

9 Claims, 4 Drawing Sheets

SYSTEM AND METHOD IN A RADAR LEVEL GAUGING SYSTEM

BACKGROUND OF THE INVENTION

1. Field of the Invention

The present invention relates to radar level gauging systems, and particularly to a radar level gauging system providing improved accuracy in gauging the level of a surface of a fluid stored in a container, when the surface is close to the bottom of the container as well as a method for such gauging.

2. Description of the Related Art

Radar level gauges are commonly used today for measuring the level of the surface of a fluid kept in a container, such as a tank, by transmitting a microwave signal towards the fluid surface and receiving a reflected microwave signal from the fluid surface, whereby the level of the fluid surface can be determined. It is important for users to achieve accurate readings of the fluid level close to the bottom and also to detect when the container is empty.

One problem is that, especially in the case when the fluid has a low dielectric constant, the main part of the reflected signal is reflected from the bottom of the container and not from the surface of the fluid. This may lead to a distorted signal, unless the filling level of the fluid is high, because then the signal reflected by the bottom will be absorbed by the fluid. This problem increases consequently when a low level of the fluid is prevalent.

Another problem is that there almost always is a layer of a by-product, such as water, in the bottom region of the container, which arises due to separation, condensate etc. Also the interface of the by-product will give a stronger reflected signal than the surface of the fluid, when the dielectric constant of the by-product is relatively high.

Previously known radar level gauges, therefore, may have limitations when it comes to measuring the level of a fluid close to the bottom of the container in which the fluid is stored.

SUMMARY OF THE INVENTION

Accordingly, it is an object of the present invention to provide an improved method for measuring a level of a surface of a product stored in a container allowing for measuring the fluid level close to the bottom of the container as well as detecting when the container is empty.

This object is achieved through a method comprising the steps of: transmitting a microwave signal towards the product surface using a radar level gauge arranged above the product surface; receiving in said radar level gauge a microwave signal reflected from the product surface; determining in a calculation unit a measured value of the product level based upon the received signal; comparing the measured value of the product level with a predetermined product level value; and determining the product level using a second level gauge arranged close to the bottom of the container when the measured value is below the predetermined product level value.

Another object of the invention is to provide an improved level gauging system for measuring a level of a surface of a product stored in a container allowing for measuring the fluid level close to the bottom of the container as well as detecting when the container is empty.

This object is achieved through providing a level gauging system for measuring a level of a surface of a product stored in a container comprising: a radar level gauge arranged above the surface of the product and arranged to transmit a microwave signal towards the product surface and receive a reflected microwave signal from the product surface; a calculation unit arranged to determine a measured value of the product level based upon the received signal; means for comparing the measured value of the product level with a predetermined product level value; and a second level gauge arranged closed to the bottom of the container and arranged to determine the product level when the measured value is below the predetermined product level value.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
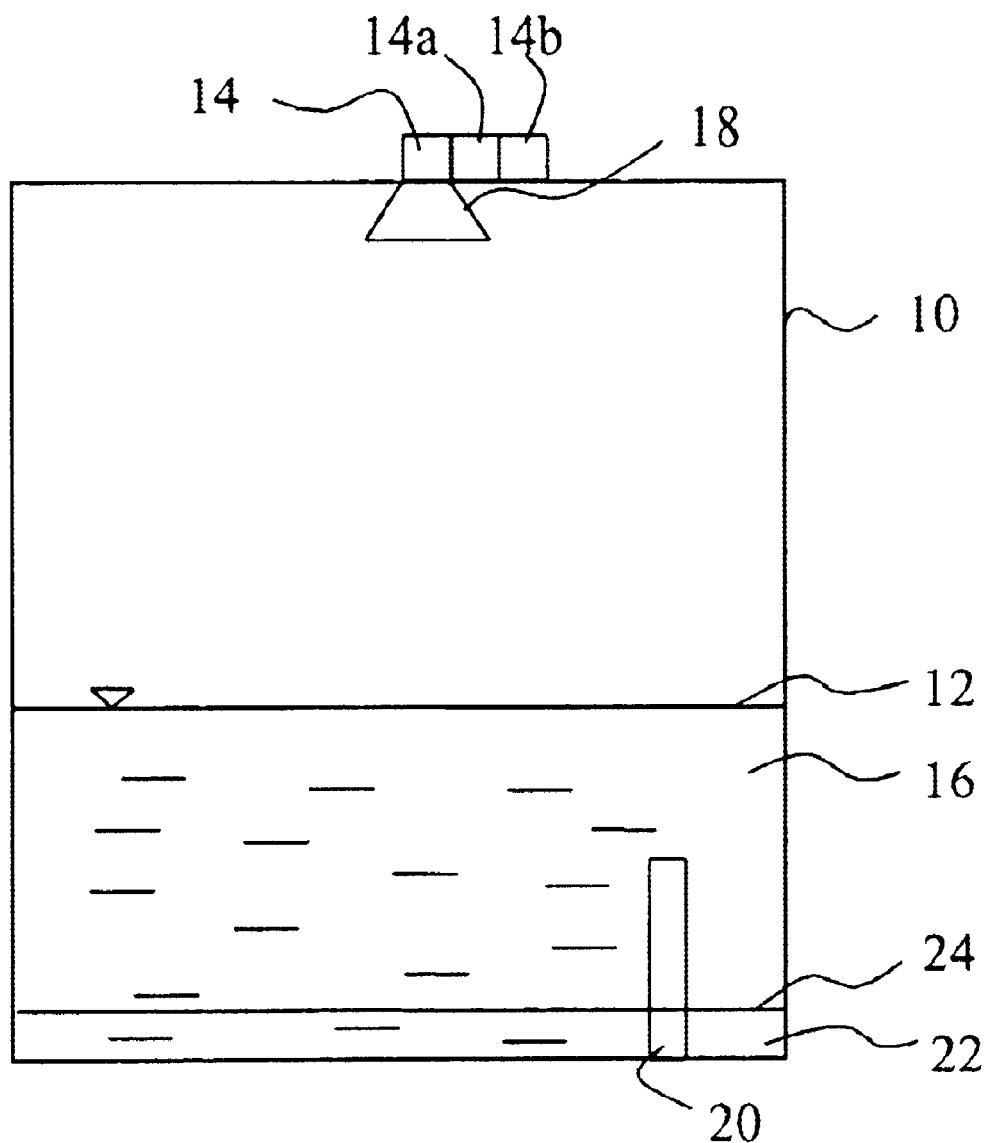
FIG. 1 discloses a schematic view of a container in which a radar level gauging system according to the present invention is installed.
Figure 2:
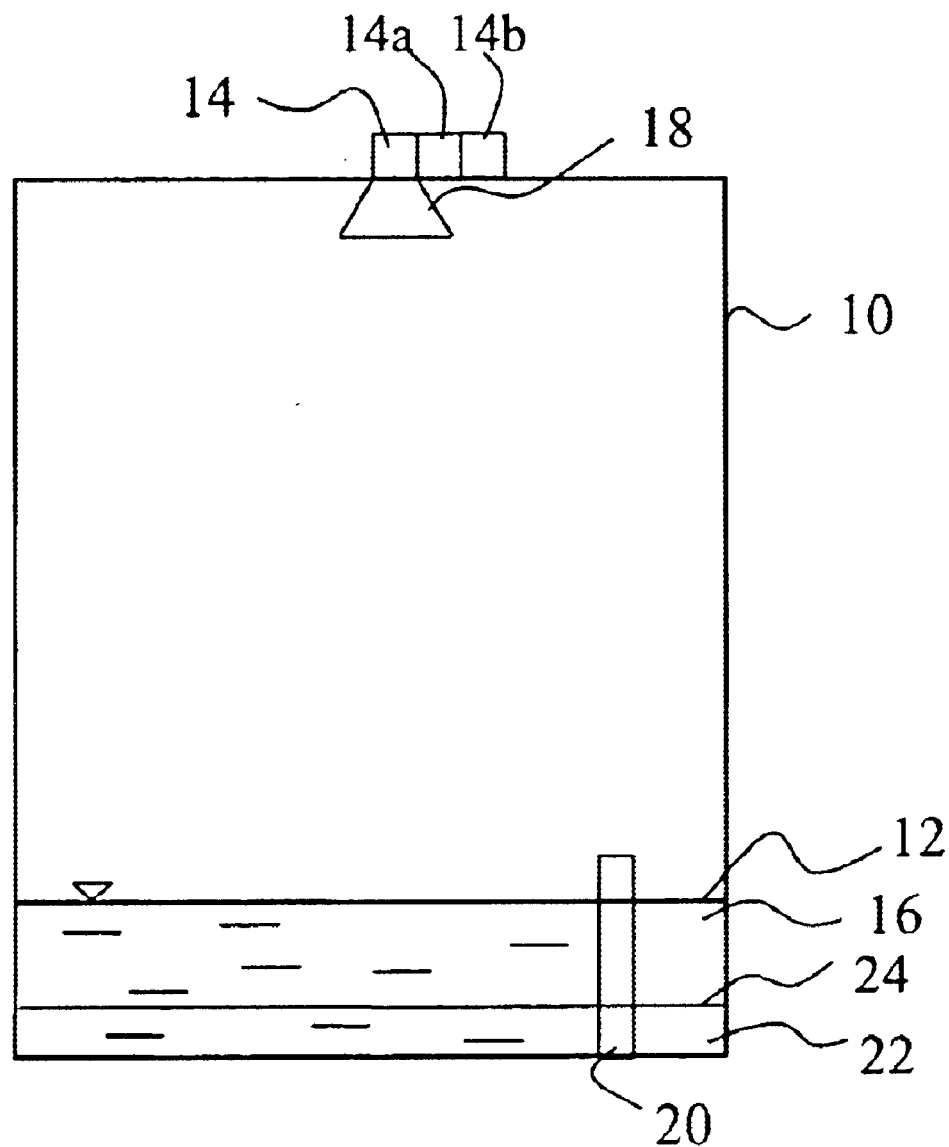
FIG. 2 shows a schematic view of a container according to FIG. 1 in which the product level in the container is lower than that in FIG. 1.

Referring to FIG. 1 and FIG. 2, a container indicated generally at 10 is filled with a fluid 16, the height or level of which is to be determined utilizing a radar level gauge 14. The radar level gauge 14 is preferably mounted on a container port at the top of the container 10 and is sealed relative thereto. The radar level gauge 14 comprises an antenna 18 which transmits microwaves towards the fluid surface 12 and receives reflected microwaves from the fluid surface 12 to provide an indication of the level of the fluid 16 kept in the container 10. The radar level gauge 14 used for transmitting microwaves and receiving the reflected microwaves is well known and is shown only schematically.

An interface gauge 20 is arranged close to the bottom of the container 10. The interface gauge 20 is arranged to measure the height or level 24 of a by-product 22 which arise in the container due to e.g. separation from or condensation of the fluid 16 etc. The radar level gauge 14 and the interface gauge 20 are connected to each other (not shown). The radar level gauge is arranged to commend the interface gauge to recalibrate and work as a level gauge instead of an interface gauge, when the radar level gauge receives bad quality of the received microwave signal or when the measured value of the level of the fluid surface 12 reaches a predetermined value, e.g. when the filling level of the fluid is low, shown in FIG. 2. In this context, the expression "the measured value" means a value of the measured fluid level in meters, i.e. the height of the measured fluid level.

The predetermined value is based on experience and is stored in the radar level gauge 14. The operator will thus get the fluid level information from the interface gauge 20 instead of the radar level gauge 14, when the filling level of the fluid 16 is low. This change of gauge may be made invisible for the operator. Or, if the operator so requires, level information from both level gauges may be provided.

The interface gauge 20 calibrates into measuring the level of the fluid surface 12 instead of the interface 24 between the by-product 22 and the fluid 16 by using the dielectric constant of air as reference point, which value preferably is stored in the interface gauge 20 and by using how much of the interface gauge 20 that is immersed in the fluid, a value provided by the radar level gauge 20, as span calibration point.

In a preferred embodiment of the present invention, the container is a tank filled with oil. Oil, especially crude oil, always contains some water which will separate from the oil and end up on the bottom of the tank. In order to be able to determine how much water there is in the tank, a water interface gauge is arranged at the bottom of the tank. The water interface gauge is in the preferred embodiment of the present invention a capacitive probe.

Capacitive probes uses a correlation that the capacitive change is directly proportional to the dielectric constant. Examples of some dielectric constants are air-1, oil-4, Ethanol-25 and water-80. The capacitive probes are well-known to the person skilled in the art and are not discussed in detail herein. The radar level gauge 14 and the capacitive probe 20 is preferably communicating via HART-protocol.

Usually, it is necessary for the capacitive probe to know which dielectric constant the product has. This causes a problem when the product is a mixture of water and oil, because then it is impossible to know the dielectric constant resulting in bad measurements. With the present invention, however, there is no need to know in advance the dielectric constant. This is due to the fact that the capacitive probe calibrates using a span calibration point provided by the radar level gauge (the length of the probe that is immersed in the product), whereby the dielectric constant of the product easily can be calculated.

Figure 3:
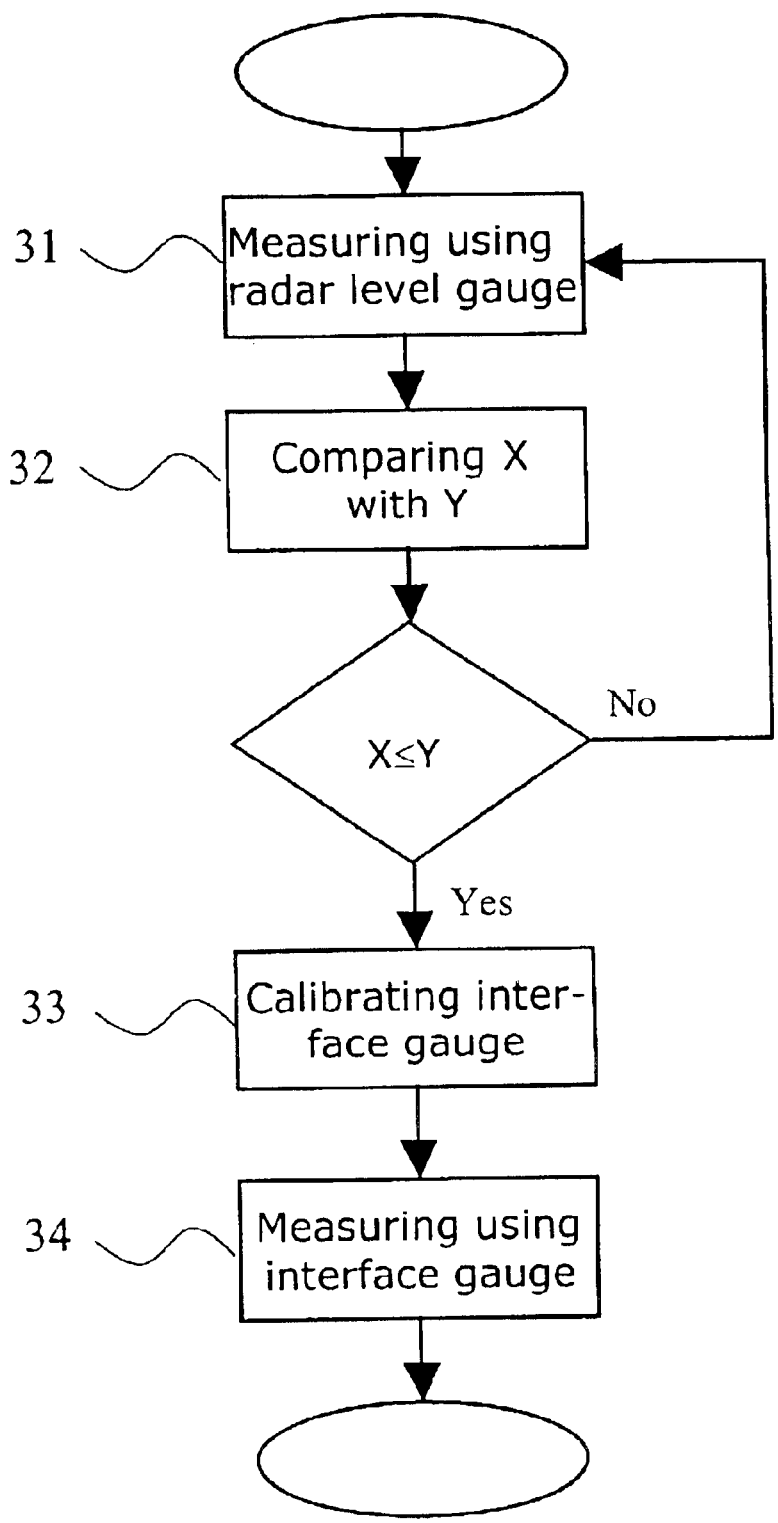
FIG. 3 is a flowchart showing the inventive method steps performed when the container is emptied.

In the preferred embodiment of the present invention, the procedure for measuring the level of the surface 12 of the fluid 16 stored in the container 10 when the container 10 is emptied, shown in FIG. 3, is as follows:

1. The radar level gauge 14 measures the level of the fluid surface 12 (step 31) by transmitting microwaves towards and receiving reflected microwaves from the fluid surface 12.
2. The measured value X is compared to a predetermined value Y stored in the radar level gauge 14 (step 32). If the measured value X is higher than the predetermined value Y, then the radar level gauge 14 measures the level of the fluid surface 12 according to step 31 until the measured value X is equal or less than the predetermined value Y.
3. When the measured value X is equal or less than the predetermined value Y, the radar level gauge 14 commends the capacitive probe 20 to calibrate into measuring the level of the fluid surface 12 instead of the water interface 24 (step 33). The water interface gauge 20 calibrates by using the dielectric constant of air as neutral point, which value preferably is stored in the capacitive probe 20 and by using how much of the probe 20 that is immersed in the fluid, a value provided by the radar level gauge 20, as span calibration point.
4. The capacitive probe 20 measures the level of the fluid surface 12 (step 34), i.e. the interface between air and fluid, by using the fact that the capacitive change in the probe 20 is directly proportional to the dielectric constant of the fluid 16.

Figure 4:
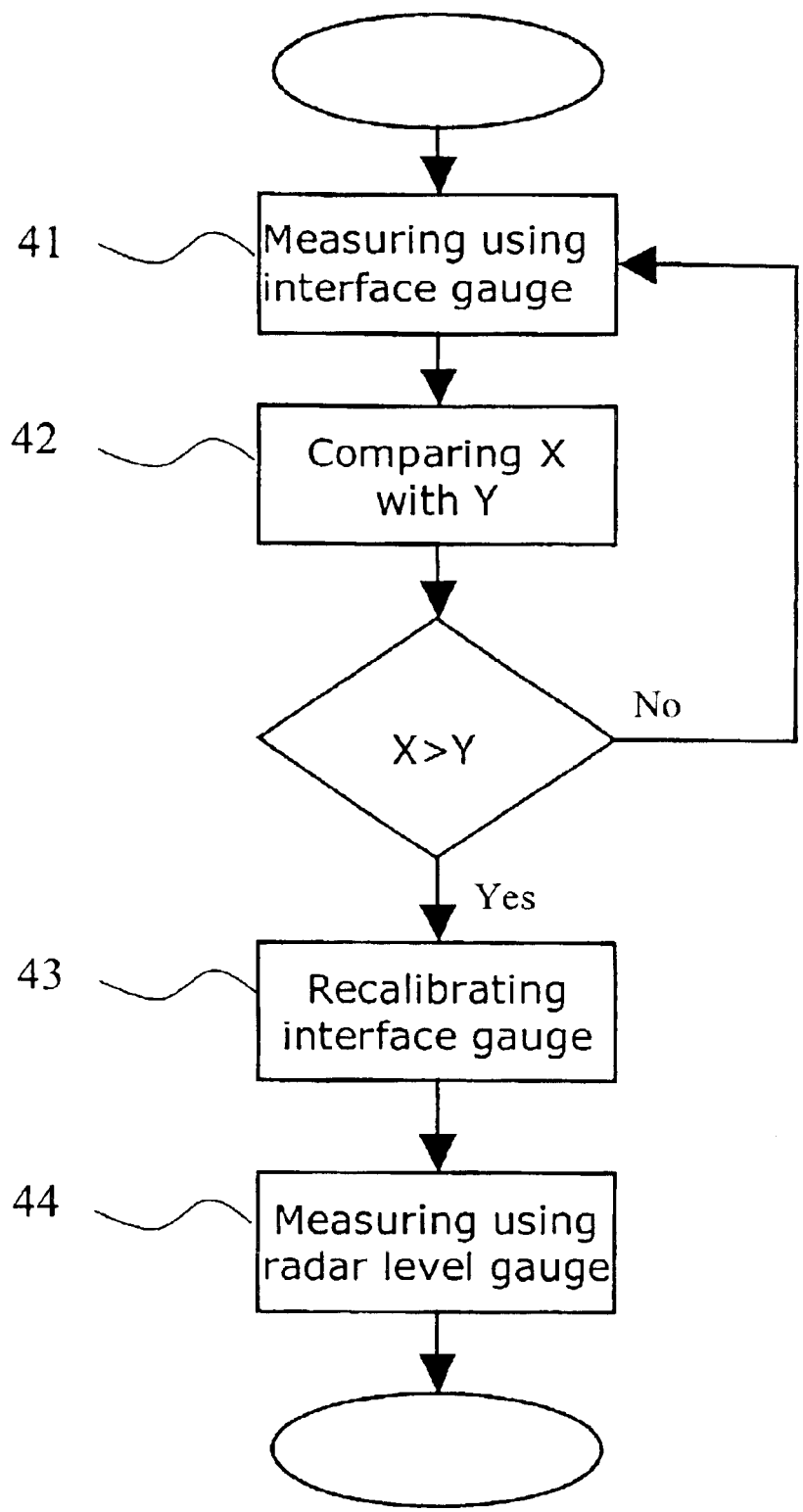
FIG. 4 is a flowchart showing the inventive method steps performed when the container is filled up.

In the preferred embodiment of the present invention, the procedure for measuring the level of the surface 12 of the fluid 16 stored in the container 10 when the container 10 is filled up, shown in FIG. 4, is as follows:

1. The capacitive probe 20 measures the level of the fluid surface 12 (step 41), i.e. the interface between air and fluid, by using the fact that the capacitive change in the probe 20 is directly proportional to the dielectric constant of the fluid 16.
2. The measured value X is compared to a predetermined value Y stored in the radar level gauge 14 (step 42). If the measured value X is equal or less than the predetermined value Y, then the capacitive probe 20 measures the level of the fluid surface 12 according to step 41 until the measured value X is higher than the predetermined value Y.
3. When the measured value X is higher than the predetermined value Y, the radar level gauge 14 commends the capacitive probe 20 to calibrate into measuring the water interface 24, i.e. the interface between water 22 and fluid 16, instead of the level of the fluid surface 12 (step 43). The capacitive probe 20 calibrates by using the calibration points (neutral point and span calibration point) for water interface 24 gauging, which points preferably are stored in the capacitive probe 20 by the manufacturer.
4. The radar level gauge 14 measures the level of the fluid surface 12 (step 44) by transmitting microwaves towards and receiving reflected microwaves from the fluid surface 12.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for measuring a level of a surface of a product stored in a container comprising the steps of:

transmitting a microwave signal towards the product surface using a radar level gauge arranged above the product surface;

receiving in said radar level gauge a microwave signal reflected from the product surface;

determining in a calculation unit a measured value of the product level based upon the received signal;

comparing the measured value of the product level with a predetermined product level value;

determining the product level using a second level gauge arranged close to the bottom of the container when the measured value is below or equal the predetermined product level value.

2. The method according to claim 1, further comprising the step of measuring by means of the second level gauge a level of an interface between the product and a by-product in the container when the product level is above the predetermined product level value.

3. The method according to claim 1, further comprising the step of using the dielectric constant of the product and the dielectric constant of air in order to determine the product level.

4. The method according to claim 1, further comprising the step of determining the product level by means of a capacitive probe which calculates the dielectric constant of the product surrounding the probe.

5. The method according to claim 4, further comprising the steps of calibrating the capacitive probe by using the dielectric constant of air as a neutral point;

providing by the radar level gauge a value of the length of the probe being immersed in the product;

calculating by means of the capacitive probe the actual value of the dielectric constant; and using said calculated dielectric constant as a span calibration point corresponding to said length.

6. A radar level gauging system for measuring a level of a surface of a product stored in a container comprising:

a radar level gauge arranged above the surface of the product and arranged to transmit a microwave signal towards the product surface and receive a reflected microwave signal from the product surface;

a calculation unit arranged to determine a measured value of the product level based upon the received signal;

means for comparing the measured value of the product level with a predetermined product level value;

a second level gauge arranged closed to the bottom of the container and arranged to determine the product level when the measured value is below or equal the predetermined product level value.

7. The radar level gauging system according to claim 6, wherein the second level gauge is arranged to measure a level of an interface between the product and a by-product in the container when the product level is above the predetermined product level value.

8. The radar level gauging system according to claim 7, wherein the second level gauge is a capacitive probe arranged to determine the product level by calibration of the capacitive probe from being arranged to measure the interface between the product and a by-product in the container to being arranged to measure the product level and, wherein a neutral point, which is the dielectric constant of air, and a span calibration point, which is a calculated dielectric constant corresponding to a value of the length of the probe being immersed in the product provided by the radar level gauge, is used in the calibration process.

9. The radar level gauging system according to claim 6, wherein the dielectric constant of the product and the dielectric constant of air are arranged to be used in order to determine the product level.

* * * * *